May 20, 1930.     H. J. BOSWORTH     1,758,925
LIGHT FIXTURE
Filed Jan. 23, 1928
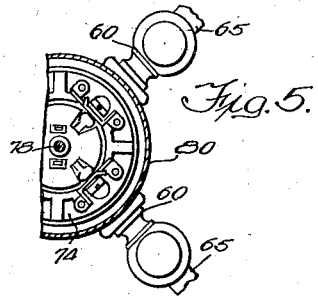
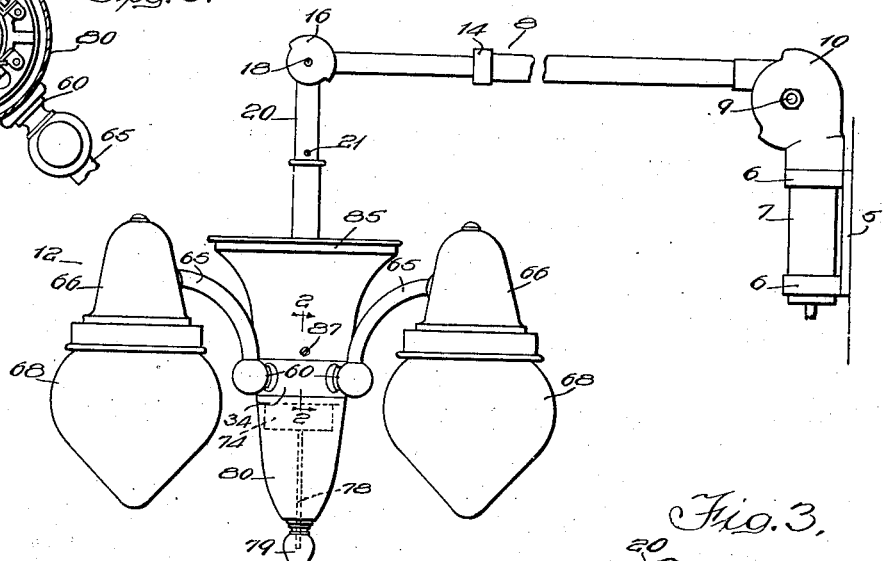
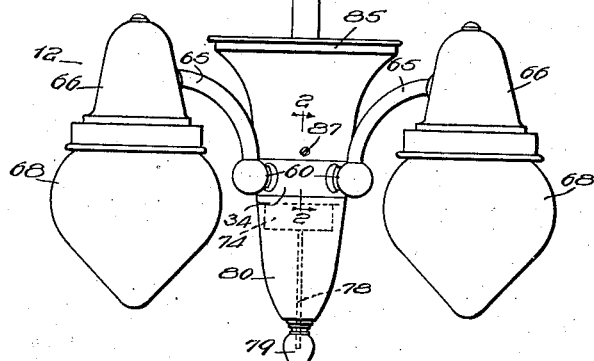
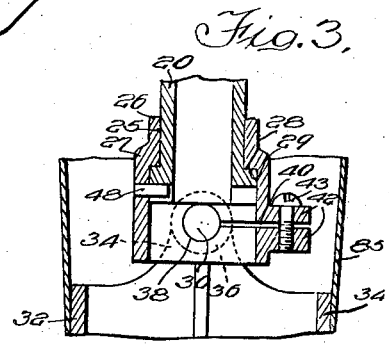
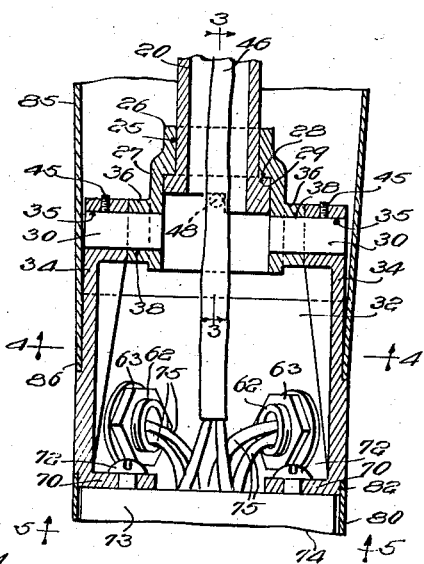
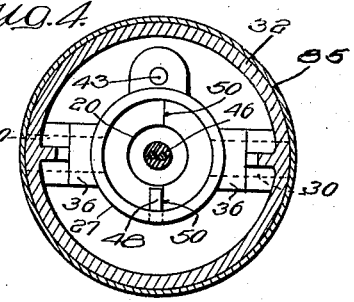
Witness:
William P. Kilroy
Inventor:
Harry J. Bosworth Patented May 20, 1930

1,758,925

UNITED STATES PATENT OFFICE

HARRY J. BOSWORTH, OF CHICAGO, ILLINOIS

LIGHT FIXTURE

Application filed January 23, 1928. Serial No. 248,621.

This invention relates to an improvement in light fixtures, more particularly to an improvement in light fixtures for dental use and the like, and its objects are the provision of a generally improved and simplified mounting of the light group or cluster and greater ease and convenience of operation or adjustment of the light or lights to different positions.

Where a ball and socket or universal joint mounting is employed, to permit tilting or angular movement of the lights to different positions, socket forming shoes and spring friction or spring pressure devices have been required for seating the ball and supplying the friction necessary to hold the light or lights in their different positions of adjustment and the freedom of operation or movement of the lights to their different positions has been impaired.

It is a feature of the present invention to eliminate the ball and socket or universal joint structure, as well as these additional spring pressure devices and socket forming shoes.

Another feature of the invention is in the freedom and ease of operation or movement of the light or lights to different positions.

Another feature lies in the increased sturdiness and greater economy of the device.

The invention is illustrated in the accompanying drawing in which:

Fig. 1 is a side elevational view of a fixture embodying the present invention;

Fig. 2 is a fragmentary vertical section taken on the line 2—2 of Fig. 1;

Fig. 3 is a fragmentary vertical section taken on the line 3—3 of Fig. 2 and at substantially right angles to the section of Fig. 2;

Fig. 4 is a horizontal section taken on the line 4—4 of Fig. 2; and

Fig. 5 is a horizontal section taken on the line 5—5 of Fig. 2.

In the drawing the wall bracket 5 has ring or sleeve portions 6, in which the cylinder 7 is rotatably mounted, the adjacent end of the tubular two-part telescoping arm 8 having pivotal support at 9 upon or in a head 10 at the top of the cylinder 7.

The swingable and extendible and retractible arm 8 together with the fixture 12 suspended or supported at the outer end thereof may be counterbalanced to remain in any angular position about the pivot 9 and with any extended or retracted position of the arm 8, by counterbalancing means such as that more fully illustrated and described in my prior Patent Number 1,644,231 issued October 4, 1927, on an application filed July 21, 1924. The wall bracket 5, cylinder mounting 7, as well as the telescoping arm 8 may also be substantially as disclosed in the above referred to patent. On the outer end of the inner tube of the arm 8 is a ferrule 14 and the outer tube of the arm 8, while preferably held in its different extended and retracted position frictionally may, of course, be provided with other means for this purpose.

In use the outer telescoping tube of the arm 8 is adapted to be drawn out or extended or moved in or retracted and the inner and outer tubes of the arm 8 are swingable, as a unit, about the pivot 9, to arrange the lights or fixture 12, at the outer end of the arm 8, for use in different positions, the counterbalancing provision referred to being adapted to retain the arm 8 and fixture 12 in any desired position into which same are swung. The counterbalancing means also preferably includes means, as set out in the above patent, for varying the counterbalancing action with different extended and retracted positions of the arm 8 to hold the arm 8 and the entire fixture carried thereby in any desired angular position and with the arm 8 extended or retracted, as desired.

Fixedly mounted upon the outer end of the outer tube of the arm 8 is a fitting 16 having a downwardly opening mouth in which and between the sides of the fitting is pivoted at 18 a pendant light support or arm 20. The pendant support 20 is preferably tubular and may be of two-part construction with the lower tube telescoping over the lower end of the upper tube and secured thereto, as by means of a set screw 21. The two-part support 20 may be extendible and retractible, if desired, and the joint adjacent the pivot 18 may, if desired, be provided with sufficient friction to retain the support 20 in different angular positions with reference to the arm 8.

The lower end of the tubular hanger 20 passes loosely through and has loose fit at 25 in the upwardly directed integral sleeve 26 of a light supporting collar 27 which turns freely upon the lower end of the hanger 20 to swing the fixture 12 into different positions about the axis of the hanger 20. The lower end of the hanger 20 has an external radial shoulder 28 and the collar 27 is provided with a correspondingly internal radial shoulder 29 which rests upon the shoulder 28 and supports the collar 27 and the fixture 12, carried thereby, upon the lower end of the tubular hanger 20. The loose fit at 25 permits free and easy operation or turning movement of the fixture 12 upon the lower end of the hanger 20 and about the axis thereof and the cooperation of the shoulder 28 with the shoulder 29 with the friction produced between these shoulders by the weight of the fixture effectively retains the same in any of its angular positions about the hanger 20 and with the fixture in any of its angular positions about the pivotal supports 30, 30.

The fixture 12 has a hub ring 32 which may be cast or otherwise suitably formed and projecting from the upper edge of this ring are a pair of diametrically opposite ears 34, 34 which may be formed integral with the ring 32. The ears 34, 34 have aligned openings 35. The lower end of the collar 27 has lateral hub-like portions 36 which fit between the ears 34, 34 and have bearing openings 38 in alignment with each other and with the openings 35. The lower end of the collar 27 is split at 40, transversely from one side to the other and substantially radially with respect to the common axis of the pins 30, and the freed sides 42 (Fig. 3) are clamped upon the inner ends of the pins 30 as by means of a screw 43 to produce any desired frictional resistance to turning movement of the inner ends of the pins 30 in the collar 27. In use the screw 43 is tightened to produce the desired frictional resistance at this point and this frictional resistance will then retain the fixture in any of its angular positions about the common axis of the pins 30, the screw 43 being conveniently tightened to take up any wear, from time to time, as desired.

The outer ends of the pins 30 are secured in the openings 35 in the ears 34 of the hub ring 32, as by means of set screws 45, or they may be secured therein as by suitable pressed fit or otherwise as desired. By employing two pins 30, 30, as shown, any obstruction or interference with the conductors 46 which lead out through the arm 8 and down through the tubular hanger 20 to the fixture lights is prevented or avoided.

With the present structure a full 360 degree movement of the fixture about the axis of the hanger 20 is unnecessary and I, therefore, limit the angular movement of the collar 27 upon the lower end of the hanger 20, preferably to substantially 180 degrees or one-half a turn. This may be accomplished by a pin or stop 48 secured to and projecting internally into the collar 27 and scarfing or otherwise forming the lower end of the hanger 20 to provide a pair of substantially diametrically opposite shoulders 50, 50 for engaging the stop 48 at the opposite limits of the 180 degree movement of the collar 27 upon the hanger 20 and limiting same thereto. It is to be understood that in some instances a greater or even less turning movement of the collar 27 or fixture upon the lower end of the hanger 20 may be desired, but with the one-half turn provided in combination with the tilting movement of the fixture about the common axis of the pins 30, I find that the fixture or cluster of lights are positionable conveniently and with ease and at the desired locations for working at substantially any angle upon the mouth. As already pointed out the friction of the split lower end of the collar 27 upon the inner ends of the pins 30 holds or retains the fixture or cluster of light in any position about the axis of the pins 30 and the friction between the shoulders 28 and 29 and the weight of the fixture holds or retains the fixture in any position about the axis of the hanger 20 and, with the loose fit at 25, without impairing the ease and freedom of movement about the axis of the hanger 20. In addition the parts are few, simple and comparatively inexpensive and the structure is sturdy and fool-proof.

The hub ring 34 is shown as provided with four hollow equally spaced fittings 60, the threaded nipples 62 of which pass through the ring 34 and are secured therein by nuts 63. The outer ends of the fittings 60 are provided with hollow knobs in each of which is secured the inner end of a generally radial tubular light arm 65. The opposite ends of the arm 65 open into and are secured to hoods 66 in which the incandescent or electric lamp sockets are arranged. The incandescent lamps or lights are positioned within the globes 68 which may be of any suitable or preferred type or construction.

The lower end of the ring 34 is provided with in-turned diametrically opposite ears 70 which are secured by screws 72 to the insulating base or support 73 of the switch 74. The conductors 46 lead to and are connected with the switch mechanism 74 and conductors 75 lead from the switch and out through the tubular arms 65 to the lights.

The switch 74 is provided with a controlling stem 78 which extends down vertically and has threaded upon its lower end an operating knob 79. While the particular type of switch may, of course, be varied this switch 74 is preferably of the four-way type having a position for turning on one light only, a second position for turning on two lights, a third position for turning on all four lights and a fourth or "off" position. The operating stem 74 is turned upon its vertical axis by the knob 79 and this knob in addition clamps a bottom cup-like hood or cover 80 in place over the switch and controlling stem and with its upper end telescoping at 82 (Fig. 2) over the lower reduced end of the ring 34 and abutting the shoulder provided thereby.

The mounting of the ring 34 upon the pins 30 and the mounting of the collar 27 upon the hanger 20 is covered by an upwardly flared closure and finishing sleeve 85 which may fit telescopically at 86, at its lower end, over the ring 34 and secured thereto by screws 87.

The arrangement of the lights provides a great range and focusing ability and with the present invention the parts are moved quickly and freely to any position for focusing the rays of light as desired. The swingable mounting of the fixture at the lower end of the hanger 20 is preferably substantially on the center of gravity of the fixture and the fixture arms and parts are preferably substantially balanced thereabout. The limiting of the turning movement of the fixture to less than a complete turn on the lower end of the hanger prevents turning or twisting the conductors loose and the group of lights are shown as substantially rigid with respect to each other.

I claim:—

1. In a light fixture of the class described, the combination of a pivotally mounted hanger having a shoulder thereon, a mounting member suspended from and adapted to turn freely on said hanger and having a shoulder cooperating with the shoulder on the hanger, and a fixture pivoted on said mounting member 2. In a light fixture of the class described, the combination of a hanger having a shoulder thereon, a mounting member mounted to turn freely on said hanger in a single plane and supported upon said shoulder, a fixture support pivoted on said mounting member to turn in a single plane substantially normal to the plane of movement of said mounting member, and a fixture on said support 3. In a light fixture of the class described, the combination of a hanger having a shoulder thereon, a mounting member mounted to turn freely on said hanger and having a shoulder supporting the mounting member upon the hanger shoulder and frictionally engaged therewith, a fixture support pivoted on said mounting member and frictionally retained in different angular positions relative thereto, and a fixture on said fixture support.

4. In a light fixture of the class described, the combination of a hanger having a shoulder thereon, a mounting member mounted to turn freely on said hanger and having a shoulder supporting the mounting member upon the hanger shoulder and frictionally engaged therewith, a fixture support pivoted on said mounting member and frictionally retained in different angular positions relative thereto, a fixture on said fixture support, and means for adjusting the friction retention of said fixture support upon the mounting member.

5. A light fixture for dental and like purposes, comprising a supporting arm, a hanger rod, means for mounting the arm on a wall, said means including a member which permits the arm to be adjusted to different positions, a plurality of lights forming a cluster in which the lights are rigid with respect to each other, and means connecting the cluster to the rod, said means including a turnable mounting supported uniformly and entirely around the hanger on a collar upon the lower end of the hanger, and a pivoted mounting upon said turnable mounting.

6. In a light fixture of the class described, the combination of a pendant support having an external radial shoulder at its lower end, a mounting member freely turnable upon the lower end of said support and having an internal radial shoulder seated upon said first shoulder, a fixture support, a fixture thereon, pintle means secured to said fixture support and turnable in the mounting member to pivot said fixture support thereon, said mounting member being split along the pintle means and means for clamping the split portion of said mounting member upon said pintle means to frictionally resist pivotal movement of the fixture upon the mounting member.

7. In a light fixture of the class described, the combination of a pendant support having an external radial shoulder at its lower end, a mounting member freely turnable upon the lower end of said support and having an internal radial shoulder seated upon said first shoulder, stop means limiting the turning movement of the mounting member upon the lower end of the pendant support to less than a complete turn, a fixture support, a fixture thereon, pintle means secured to said fixture support and turnable in the mounting member to pivot said fixture support thereon, said mounting member being split along the pintle means and means for clamping the split portion of said mounting member upon said pintle means to frictionally resist pivotal movement of the fixture upon the mounting member.

8. In a light fixture of the class described, the combination of a pendant support having an external radial shoulder at its lower end, a mounting member freely turnable upon the lower end of said support and suspended from said support by an internal radial shoulder seated upon said first shoulder, stop means independent of the suspension of said mounting member upon said support for limiting the turning movement of the mounting member upon the lower end of the pendant support to less than a complete turn, said stop means comprising substantially diametrically opposite shoulders on the pendant support, and a stop pin secured to the mounting member and engageable with said shoulders at its opposite limit of movement.

9. In a fixture of the class described, the combination of a hanger, a mounting member mounted to turn freely upon the lower end thereof, a fixture support pivoted on said mounting member on an axis substantially normal the axis of turning of the mounting member upon the hanger, said fixture support comprising a ring member having a plurality of radial light arms, a switch mounted upon said ring member, a hood covering said switch and telescopically engaged with said ring member, a switch controlling stem passing downwardly through the lower end of said hood, and a controlling knob mounted upon the lower end of said stem and holding said hood upon said ring member.

10. In a fixture of the class described, the combination of a hanger, a mounting member mounted to turn freely upon the lower end thereof, a fixture support pivoted on said mounting member on an axis substantially normal the axis of turning of the mounting member upon the hanger, said fixture support comprising a ring member having a plurality of radial light arms, a switch mounted upon said ring member, a hood covering said switch and telescopically engaged with said ring member, a switch controlling stem passing downwardly through the lower end of said hood, a controlling knob mounted upon the lower end of said stem and holding said hood upon said ring member and an upwardly flared sleeve telescopically engaged with and extending upwardly from said ring member.

11. A light fixture for dental and like purposes comprising, a stationary bracket, a cylindrical support mounted in said bracket and free to rotate about a vertical axis, a telescoping supporting arm mounted on said support and free to rotate through a limited arc about a horizontal axis, a pendent support pivoted to the end of said arm for rotation about a horizontal axis, a collar supported by a ring on the end of said pendant and free to rotate about a vertical axis, a light fixture pivoted to said collar, and an electrical conductor for said light fixture wholly concealed within said fixture, collar, pendant, arm, and support.

12. In a light fixture the combination of a pendant support swingably mounted at its upper end, a mounting member journaled intermediate its opposite sides to turn freely upon the lower end of said support and in a plane intersecting said support and a fixture pivoted on said mounting member on opposite sides the intermediate journal of said member on said support and substantially balanced on said pendant support for swinging movement in a plane at substantially right angles to the plane of movement of the mounting member upon the support.

13. In a light fixture, the combination of a supporting stem having a swingable mounting at its upper end and depending therefrom, abutment means on said stem, a collar freely rotatable about said stem and suspended upon said abutment means, a fixture having pivotal support upon opposite sides of said collar and depending therefrom and a sleeve telescopically engaged with said fixture and surrounding the rotatable mounting of the collar on said stem and the pivotal mounting of the fixture on said collar.

14. In a light fixture, the combination of a supporting stem having a swingable mounting at its upper end and depending therefrom, abutment means on said stem, a collar freely rotatable about said stem and suspended upon said abutment means, said collar having a split bearing part, and a fixture having pins journaled in said split bearing part on opposite sides of said collar.

In witness whereof, I have hereunto subscribed my name this 16th day of January, 1928.

HARRY J. BOSWORTH.